United States Patent Office 2,851,491
Patented Sept. 9, 1958

2,851,491

LEAD-CATALYZED CONVERSION OF RICINOLEIC COMPOUNDS

Frank C. Naughton, North Bergen, N. J., and Philip Carmine Daidone, Westbury, N. Y., assignors to The Baker Castor Oil Company, Jersey City, N. J., a corporation of New Jersey No Drawing. Application October 4, 1954
Serial No. 460,244

17 Claims. (Cl. 260—537)

This invention relates to the alkali conversion of ricinoleic compounds, especially as catalyzed by certain lead compounds.

Numerous processes are known in the art which convert ricinoleic compounds into sebacic acid (sodium salt), capryl alcohol and other products, including omega-hydroxydecanoic acid, by the aid of alkali fusion. These processes vary in reaction conditions and yields obtained. Most of them are multi-step processes, require cumbersome equipment, and/or show low yields.

It is an object of this invention to treat ricinoleic compounds by an improved process for the production of, primarily, sebacic acid. It is a further object of this invention to obtain the products of said process in greatly improved yields. Other objects will be apparent from the following description of the invention.

The process of this invention involves the alkali conversion of ricinoleic compounds in the presence of a catalyst consisting of a lead compound. Greatly improved yields of the conversion products are obtained when operating with the catalysts of this invention. Any of the prior art processes for the production of sebacic acid by the alkali fusion route can be considerably benefited by the use of the catalysts of this invention, but this invention will be exemplified herein by comparison with one type of prior art process.

The catalysts of this invention are lead compounds selected from the group consisting of inorganic lead compounds and lead salts of organic acids. Typical lead compounds within this category include, by way of example, lead mono-oxide, lead di-oxide, lead sesqui-oxide, lead sub-oxide, red lead, lead oxychlorides, lead chloride, lead tetra-chloride, lead carbonate, lead hydroxide, lead orthophosphate, lead metaphosphate, lead pyrophosphate, lead phosphite, lead sulfate, lead acetate, lead phenolate, lead benzoate, lead oxalate, lead citrate, lead tartrate, lead ricinoleate, lead heptanoate, lead undecenoate, lead laurate, lead stearate, and lead 12-hydroxystearate. All of these and the other lead compounds in the indicated group have the common characteristic of being capable of forming plumbates or plumbites under the conditions for the conversion of ricinoleic compounds. The advantages of this invention are attained when the catalyst is present in an amount of from about 1 to about 20 wt. percent (calculated on the basis of PbO), based on the amount of ricinoleic compound being subjected to alkali fusion.

The ricinoleic compound used in the process of this invention is preferably an alkali ricinoleate. However, other ricinoleic compounds are suitable for use in the process of this invention, and include caster oil, other ricinoleic acid esters, such as methyl ricinoleate, capryl ricinoleate, and propylene glycol ricinoleate, ricinoleic acid, ricinoleic acid amides, ricinoleyl alcohol, ricinoleyl alcohol esters, and the like. The preferred alkali ricinoleates may be the salts of alkali or alkaline earth metals, e.g., sodium, potassium, lithium, calcium, and barium.

The free alkali used in the process of this invention is a strong alkali which may suitably be an alkali or alkaline earth oxide, hydroxide, or carbonate. It is desirable to have the strong alkali present in the reaction mixture in stoichiometric excess. Although this excess can be very slight, it preferably ranges from at least a 40% excess to not substantially more than a 300% excess (that is, from about 1.4 to about 4.0 times the stoichiometric amount of alkali required theoretically for the conversion reaction). In cases where ricinoleic compounds other than alkali salts are used as the starting materials in the process of this invention, sufficient additional alkali, corresponding to the amount required for the formation of the alkali salt, should be present in the mixture introduced into the reactor.

Since water is a reactant in the conversion of ricinoleic compounds according to the process of this invention, water should be present in the reaction zone in at least stoichiometric amount. The required water can be introduced as such, formed in situ during the saponification of the ricinoleic compound, or introduced in the form of steam or superheated steam.

The reaction mixture or the individual constituents thereof can be introduced into the reactor in solid form, preferably finely divided, in aqueous solution, in another solvent such as phenol, or in the presence of a diluent such as a hydrocarbon oil.

When the process of this invention is directed primarily toward the production of capryl alcohol and a salt of sebacic acid, suitable reaction temperatures are in the range from about 225° to about 425° C. Preferred reaction temperatures for this conversion are in the range from about 225° to about 300° C. At lower reaction temperatures, down to about 180° C., the products are primarily methyl hexyl ketone and a salt of omega-hydroxydecanoic acid. The indicated reaction temperatures can suitably be attained through the application of external heat to the reactor, or by the inroducion of seam or superheated steam into the reactor.

No special type of reactor is required for the process of this invention. The reactor can be a container with means for charging the reactants and exit means with a condenser system for the condensable vapors. Under some conditions, agitation means are desirable for improving the contact of the reactants. The apparatus can be constructed from, e. g., cast iron, but, in order to ensure the maximum purity of the products, stainless steel or nickel equipment may desirably be used.

The final reaction mixture is worked up for recovery of the products by conventional methods. Thus, the salt of sebacic acid which is formed in the conversion reaction can be treated with a dilute mineral acid to yield free sebacic acid. The capryl alcohol is taken off overhead during the course of the reaction and condensed, and is recovered by mechanical separation from the water which condenses with it.

Examples of the process of this invention and the advantages thereof are given below, in comparison with runs in which the lead catalyst is absent:

*Example 1.* (*Sodium ricinoleate; 200% excess of sodium hydroxide; no catalyst*)

The reactor was a 1 liter 3-necked, round bottom flask. The flask openings were fitted with an inlet from a steam superheater, a thermometer, and an adapter connected to a condenser and fraction cutter. The steam was generated in a 5 liter flask and passed through copper tubing to a Fisher superheater; the resulting superheated steam was passed to the flask inlet via copper tubing.

The reaction charge, 125 gms. of a mixture of sodium ricinoleate and sodium hydroxide (200% excess), i. e., 94 gms. of sodium ricinoleate (tech.) and 31 gms. of sodium hydroxide, was charged to the reaction flask, and the indicated items were connected to the flasks. The flask was jacketed with electric heaters, and the heat was turned on at this point. When the reactor temperature had reached 90° C., the introduction of superheated steam at an initial temperature of 345° C. was started. The steam temperature was gradually increased to 360° C., and the total period of steam introduction into the reactor was 1.75 hrs. The reaction temperature in this run was 264°–294° C. The amount of capryl alcohol recovered in the condensate was 9.0 gms., corresponding to a yield which was 27.0% of theoretical. After being cooled, the product of the fusion reaction was removed from the reactor by dissolving the product in water. Dilute sulfuric acid was added to bring the pH to approximately 2–3, and the resulting solution was brought to a boil. The fatty layer was decanted by means of a separatory funnel, and was washed three times with 500 cc. of boiling water to recover any sebacic acid from that layer. The sebacic acid was obtained by cooling the combined aqueous solutions, and by subsequent filtration to collect the precipitated sebacic acid. The sebacic acid recovery amounted to 5.3 gms., corresponding to a yield which was 10.2% of theoretical.

*Example 2. (Sodium ricinoleate; 200% excess of sodium hydroxide; 8.1 wt. percent of red lead)*

The charge in this example was the same as in Example 1, except for the inclusion of 7 gms. of red lead (8.1 wt. percent, calculated on the basis of PbO, and based on the amount of sodium ricinoleate charged). In this run, the initial temperature of the superheated steam was 305° C., and this was increased to 360° C.; the passage of the steam into the reactor was continued for 2.33 hrs. The reaction temperature was in the range from 255° to 294° C. The capryl alcohol recovered amounted to 13.8 gms., corresponding to a yield of 41.6% of theoretical (representing a 54% increase over the yield of capryl alcohol in Example 1). The sebacic acid recovery, per the method of Example 1, amounted to 13.9 gms., corresponding to a yield of 26.9% of theoretical (representing a 164% increase over the sebacic acid yield in Example 1).

*Example 3. (Sodium ricinoleate; 300% excess of sodium hydroxide; no catalyst)*

The charge to the reactor was 100 gms. of sodium ricinoleate (tech.) and 43.6 gms. of powdered sodium hydroxide; this charge was mixed well after its introduction into the reactor. The initial temperature of the superheated steam introduced into the reactor was 305° C., and this was increased to 360° C.; the period of steam introduction was 1.08 hrs. The reaction temperature was in the range from 233° to 290° C. The capryl alcohol collected amounted to 13.5 gms., for a yield of 37.6% of theoretical. The sebacic acid recovery amounted to 14.5 gms., for a yield of 26.9% of theoretical.

*Example 4. (Sodium ricinoleate; 300% excess of sodium hydroxide; 7.9 wt. percent of lead mono-oxide)*

The charge to the reactor was the same as in Example 3, except for the inclusion of 7.0 gms. of lead mono-oxide (7.9 wt. percent, based on the weight of the sodium ricinoleate). The temperature of the superheated steam initially was 295° C., and this was increased ot a maximum of 360° C.; the passage of the steam through the reactor was continued for 1.5 hrs. The reaction temperature was in the range from 242° to 288° C. The capryl alcohol recovery amounted to 17.5 gms., equivalent to a yield of 48.6% of theoretical (representing a 29% increase over the capryl alcohol yield in Example 3). The amount of sebacic acid recovered was 26.0 gms., equivalent to a yield of 46.4% of theoretical (representing a 72.5% increase over the sebacic acid yield in Example 3).

*Example 5. (Sodium ricinoleate; 300% excess of sodium hydroxide; 11.0 wt. percent of red lead)*

The reaction charge was the same as in Example 3, except for the inclusion of 10 gms. of red lead (11.0 wt. percent, based on the sodium ricinoleate, and calculated as PbO). The initial temperature of the superheated steam led into the reactor was 350° C., and this was increased to 360° C.; the period of steam introduction into the reactor was 1.67 hrs. The reaction temperature ranged from 228° to 297° C. The capryl alcohol recovery amounted to 16.0 gms., corresponding to a yield of 44.5% of theoretical (representing an 18% increase over the capryl alcohol yield in Example 3). The sebacic acid recovery amounted to 23.5 gms., corresponding to a 42.0% yield of theoretical (representing a 56% increase over the sebacic acid yield in Example 3).

*Example 6. (Sodium ricinoleate; 1,930% excess of sodium hydroxide; no catalyst)*

A mixture of 64 gms. of sodium ricinoleate (tech.) and 144 gms. of powdered sodium hydroxide was charged to the reactor used in the preceding examples. Superheated steam, at a temperature of 360° C., was then introduced into the reactor over a period of 1.84 hrs. The reaction temperature ranged from 230° to 300° C. Capryl alcohol was recovered in an amount of 9.8 gms., equivalent to a yield of 41.8% of theoretical. The sebacic acid recovery amounted to 15.0 gms., corresponding to a yield of 41.7% of theoretical.

*Example 7. (Sodium ricinoleate; 1,930% excess of sodium hydroxide; 6.2 wt. percent of lead mono-oxide)*

The reactor charge was the same as in Example 6, except that 3.5 gms. of lead mono-oxide (6.2 wt. percent, based on the amount of sodium ricinoleate) were also included in the mixture. Superheated steam, at a temperature of 360° C., was introduced into the reactor over a period of 2.5 hrs. The reaction temperature ranged from 236° o 279° C. The capryl alcohol recovery amounted to 12.6 gms., corresponding to a yield of 54.0% of theoretical (representing a 29% increase over the capryl alcohol yield in Example 6). The sebacic acid recovery amounted to 21.0 gms., equivalent to a yield of 58.5% of theoretical (representing a 40% increase over the sebacic acid yield in Example 6).

*Example 8. (Methyl ricinoleate; 100% excess of lithium hydrate; 15 wt. percent of lead chloride)*

Two runs were made for comparative purposes, the indicated catalyst addition being made in only one of the runs. The charge to the reactor, such as was used in the preceding examples, was 102.7 gms., of purified methyl ricinoleate and 41.4 gms. of lithium hydrate; in the catalyzed run, 19.2 gms. of lead chloride (15 wt. percent, based on the amount of methyl ricinoleate, and calculated as PbO) were also charged to the reactor. During the first stage of the reaction, the reactor heaters were the only source of heat, and provision was made for agitation of the reaction mixture. After holding the reaction mixture at about 100° C. for 30 minutes, the reaction was continued as in the preceding examples. Superheated steam was passed into the reactor, the temperature of the steam being about 410° C.; passage of the steam into the reactor was continued for about 1.5–2.0 hrs. The average reaction temperature maintained during these runs was about 350° C. The sebacic acid yield in the catalyzed run represented an increase of about 65% over the sebacic acid yield in the corresponding run made without catalyst.

*Example 9. (Ricinoleyl alcohol; 100% excess of sodium hydroxide; 20 wt. percent of lead phenolate*

As in Example 8, two comparative runs were made to determine the effect of the use of the indicated catalyst. The charge to the reactor was 100 gms. of purified ricinoleyl alcohol and 42.2 gms. of sodium hydroxide. In the catalyzed run, 35.2 gms. of lead phenolate (20 wt. percent, based on the amount of ricinoleyl alcohol, and calculated as PbO) were also charged to the reactor. The reaction was conducted as in Example 8, except that the superheated steam was introduced into the reactor at a temperature of about 465° C.; in these runs, the reaction temperature averaged about 415° C. The sebacic acid yield in the catalyzed run represented a 75% increase over the sebacic acid yield in the run made in the absence of a catalyst.

*Example 10. (Sodium ricinoleate; 50% excess of sodium hydroxide; 10 wt. percent of lead ricinoleate)*

This example was effected according to the technique used in Examples 1–7, except that two comparative runs were made, with the catalyst being present in only one of the runs. The charge to the reactor was 100 gms. of sodium ricinoleate (tech.) and 16.1 gms. of powdered sodium hydroxide; in the catalyzed run, 32.0 gms. of lead ricinoleate (10 wt. percent, based on the weight of sodium ricinoleate, and calculated as PbO) were also introduced into the reactor. Superheated steam, at a temperature of 360° C., was charged to the reactor over a period of 1.5–2.0 hrs. The reaction temperatures ranged between 280° and 300° C. The sebacic acid recovery in the catalyzed run represented an 88% increase in yield over the sebacic acid produced in the uncatalyzed run.

*Example 11. (Barium ricinoleate; 100% excess of barium oxide; 7.5 wt. percent of lead acetate)*

As in Example 10, comparative runs were made to show the effect of the indicated catalyst. The charge to the reactor was 150 gms. of barium ricinoleate (tech.) and 56.6 gms. of barium oxide; in the catalyzed run, 17.2 gms. of lead acetate (7.5 wt. percent, based on the amount of barium ricinoleate, and calculated as PbO) were also included in the reaction charge. The superheated steam was introduced at a temperature of about 375° C. over a period of about 1.5–2.0 hrs. An average reaction temperature of about 310° C. was maintained in these runs. The sebacic acid recovery in the catalyzed run represented a 62% increase over the yield of sebacic acid in the uncatalyzed run.

*Example 12. (Potassium ricinoleate; 200% excess of potassium carbonate; 1 wt. percent of lead di-oxide)*

As in Example 10, comparative runs were made to determine the effect of the indicated catalyst. The charge to the reactor was 125 gms. of potassium ricinoleate (tech.) and 68.4 gms. of potassium carbonate; in the catalyzed run, 1.2 gms. of lead di-oxide (1 wt. percent, based on the amount of potassium ricinoleate, and calculated on the basis of PbO) were also included in the reaction charge. Superheated steam, at a temperature of 360° C., was introduced into the reactor over a period of 1.5–2.0 hrs. The reaction temperature in these runs was maintained at about 275° to about 295° C. The sebacic acid recovery in the catalyzed run represented a 38% increase in yield over the sebacic acid obtained in the uncatalyzed run.

The foregoing examples give a good indication of the improvements which can be effected when operating to produce sebacic acid according to the process of this invention. The most noteworthy effect is the vastly improved yields of sebacic acid and capryl alcohol which are obtained when the fusion process is conducted in the presence of the lead catalysts of this invention. Such improved yields are not limited to the particular examples herein, but can be duplicated with any of the processes for conducting the conversion of ricinoleic compounds into sebacic acid by alkali fusion. Another desirable feature of this invention is that the improved yields enable the use of simplified recovery techniques for the sebacic acid, as the yields obtainable by the process of this invention are indicative of the fact that the corresponding products are not as contaminated with fatty materials (unconverted reactants) as is the case with prior art processes.

Many modifications and variations of the invention as hereinbefore set forth will be apparent to those skilled in the art and are within the spirit of the appended claims.

What is claimed is:

1. A process for the scission of ricinoleic compounds, which comprises pyrolyzing a mixture of a ricinoleic compound, a strong alkali as a reactant and as a reaction promoter, and at least stoichiometric amounts of water in the presence of a catalyst which is a lead compound selected from the group consisting of inorganic lead compounds and lead salts of organic acids.

2. The process of claim 1, in which said ricinoleic compound is an alkali metal salt of ricinoleic acid.

3. The process of claim 1, in which said ricinoleic compound is sodium ricinoleate.

4. The process of claim 1, in which said ricinoleic compound is a ricinoleic acid ester.

5. The process of claim 1, in which said ricinoleic compound is ricinoleyl alcohol.

6. The process of claim 1, in which said strong alkali is chosen from the group consisting of oxides, hydroxides, and carbonates of alkali and alkaline earth metals.

7. The process of claim 1, in which said strong alkali is an alkali metal hydroxide.

8. The process of claim 1, in which said strong alkali is sodium hydroxide.

9. The process of claim 1, in which said strong alkali is present in stoichiometric excess.

10. The process of claim 1, in which said catalyst is present in an amount of from about 1 to about 20 wt. percent (calculated on the basis of PbO), based on the amount of said ricinoleic compound.

11. The process of claim 1, in which said catalyst is an inorganic lead compound.

12. The process of claim 1, in which said catalyst is a lead oxide.

13. The process of claim 1, in which said catalyst is lead mono-oxide.

14. The process of claim 1, in which said catalyst is a lead salt of an organic acid.

15. The process of claim 1, in which said conversion is directed primarily toward the production of capryl alcohol and a salt of sabacic acid, and is effected at a reaction temperature in the range from about 225° to about 425° C.

16. The process of claim 1, in which said conversion is effected at a reaction temperature in the range from about 225° to about 300° C.

17. The process of claim 1, in which at least a portion of the heat required for effecting said conversion is provided by contacting the reaction mixture with steam.

References Cited in the file of this patent

UNITED STATES PATENTS

| | | |
|---|---|---|
| 2,217,516 | Houpt | Oct. 8, 1940 |
| 2,580,931 | Lane | Jan. 1, 1952 |
| 2,644,837 | Schweitzer | July 7, 1953 |
| 2,696,500 | Stein | Dec. 7, 1954 |

FOREIGN PATENTS

| | | |
|---|---|---|
| 652,355 | Great Britain | Apr. 25, 1951 |